United States Patent
Akita

(10) Patent No.: US 7,120,012 B2
(45) Date of Patent: Oct. 10, 2006

(54) ATTACHMENT STRUCTURE OF REAR PANEL TO TUNER

(75) Inventor: Takashi Akita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/807,040

(22) Filed: Mar. 23, 2004

(65) Prior Publication Data

US 2004/0190980 A1    Sep. 30, 2004

(30) Foreign Application Priority Data

Mar. 25, 2003    (JP)    ............ 2003-001555 U

(51) Int. Cl.
*H05K 7/00*    (2006.01)

(52) U.S. Cl. ............ 361/683; 248/27.1; 403/408.1; 403/275

(58) Field of Classification Search ............ 403/408.1, 403/275; 248/27.1; 211/26; 361/683
See application file for complete search history.

(56) References Cited

U.S. PATENT DOCUMENTS

| | | | | |
|---|---|---|---|---|
| 4,462,564 A | * | 7/1984 | Alves et al. | ............ 248/27.1 |
| 4,790,501 A | * | 12/1988 | Waters | ............ 248/27.1 |
| 4,920,799 A | * | 5/1990 | Low | ............ 73/431 |
| 5,441,421 A | * | 8/1995 | Ponticelli et al. | ............ 439/284 |
| 6,634,693 B1 | * | 10/2003 | Straesser, Jr. | ............ 296/70 |
| 6,666,413 B1 | * | 12/2003 | Nakajima | ............ 248/27.1 |

FOREIGN PATENT DOCUMENTS

JP    P2002-134940 A    5/2002

* cited by examiner

*Primary Examiner*—James M. Hewitt
*Assistant Examiner*—Michael P. Ferguson
(74) *Attorney, Agent, or Firm*—Osha Liang LLP

(57) ABSTRACT

In an attachment structure of a rear panel to a tuner, a rear panel to be attached to a tuner that is smaller in depth size has, in portions corresponding to connector connection parts of the tuner, two holes for inserting the connector connection parts, and has, in a portion corresponding to a small protrusion with a tapped hole of the tuner, a small cylindrical part. When the rear panel is attached onto the front surface of the tuner, the two connector connection parts of the tuner are inserted into the two holes, a leading end of the small cylindrical part is brought into contact with a front surface of the small protrusion with the tapped hole of the tuner, a male screw is inserted into the small cylindrical part from the front surface side of the rear panel, and a leading end of the male screw is screwed into the tapped hole.

1 Claim, 3 Drawing Sheets

ATTACHMENT STRUCTURE OF REAR PANEL TO TUNER

BACKGROUND OF THE INVENTION

1. Field of the Invention

The present invention relates to attachment structure of a rear panel to a tuner in which rear panels are attached and fixed respectively onto front surfaces of two tuners different from each other in depth size, of which each has two connector connection parts protruding in front, and a small protrusion with a tapped hole for panel attachment provided in a middle position between the connector connection parts.

2. Description of the Related Art

Conventionally an attachment structure of a rear panel to this kind of tuner has a rear panel 102 to be attached and fixed on a front surface of a tuner 101 that is smaller in depth size as shown in FIG. 4. Portions of the rear panel 102 corresponding to two connector connection parts 103, 103 and a small protrusion with a tapped hole of a tuner 101 is recessed by drawing, and then the rear panel 102 is brought into contact with the front surface of the tuner 101, and a male screw 105 is screwed into a small protrusion 104 with a tapped hole, whereby the rear panel 102 is attached and fixed.

However, there has been a problem that structure of a die for drawing the rear panel becomes complicated.

Another related art is shown in FIG. 5. In structure in which holes 201a and 201b are provided on the upper side and the lower side of a housing 201 of an electronic control device including pressed products, and one screw 104 passes through the upper hole 201a and the lower hole 201b, after the lower hole 201b has been subjected to burring, a burring hole forming side is expanded by press, and the expanded diameter by this expanding work is set to 1.3 times or more the size of the burring diameter, whereby the screw 204 that has passed the upper hole 201a becomes easy to pass through the lower hole 201b (refer to JP-A-2002-134940).

However, this structure only makes the screw 204 pass through the upper hole 201a and the lower hole 201b easily.

SUMMARY OF THE INVENTION

It is an object of the invention to provide an attachment structure of a rear panel to a tuner, in which the attachment structure can be simplified, structure of a die for molding a rear panel can be simplified, and the rear panel can be widely applicable tuners that are different in depth size.

The invention has been proposed in order to solve the above problem. According to a first aspect of the invention, there is provided an attachment structure of a rear panel to a tuner, in which a rear panels is attached and fixed onto a front surface of a tuner, the tuner having two connector connection parts protruding in front and a small protrusion with a tapped hole for panel attachment provided in a middle position between the connector connection parts, the attachment structure including: the rear panel having two holes for inserting the connector connection parts in portions corresponding to the two connector connection parts of the tuner and a small cylindrical part that is formed protrusively to the tuner side by burring in a portion corresponding to the small protrusion with the tapped hole of the tuner; and a male screw; wherein the two connector connection parts of the tuner are inserted into the two holes of the rear panel, and a leading end of the small cylindrical part is brought into contact with a front surface of the small protrusion with the tapped hole of the tuner, and under this state, the male screw is inserted into the small cylindrical part from the front surface side of the rear panel and further a leading end of the male screw is screwed into the tapped hole of the small protrusion with the tapped hole of the tuner, whereby the rear panel is attached and fixed onto the front surface of the tuner.

According to a second aspect of the invention, there is provided an attachment structure of a rear panel to a tuner, in which a rear panels is attached and fixed onto a front surface of a tuner, the tuner having two connector connection parts protruding in front and a small protrusion with a tapped hole for panel attachment provided in a middle position between the connector connection parts, the attachment structure including: the rear panel having two holes for inserting the connector connection parts in portions corresponding to the two connector connection parts of the tuner and a small cylindrical part that is formed protrusively to the tuner side in a portion corresponding to the small protrusion with the tapped hole of the tuner; and a male screw; wherein the two connector connection parts of the tuner are inserted into the two holes of the rear panel, and a leading end of the small cylindrical part is brought into contact with a front surface of the small protrusion with the tapped hole of the tuner, and under this state, the male screw is inserted into the small cylindrical part from the front surface side of the rear panel and further a leading end of the male screw is screwed into the tapped hole of the small protrusion with the tapped hole of the tuner, whereby the rear panel is attached and fixed onto the front surface of the tuner.

According to a third aspect of the invention, the attachment structure of a rear panel to a tuner is characterized in that the small cylindrical part of the rear panel is formed by burring, and a peripheral projection part that comes into contact with the front surface of the tuner is formed in a portion of each of the two holes by burring.

According to a fourth aspect of the invention, the attachment structure of a rear panel to a tuner is characterized in that: the small cylindrical part of the rear panel is formed by burring; in a portion of each of the two holes, a part having plural cuts in circular direction of a hole edge is formed by blanking; the cuts are bent toward the front side of the tuner thereby to form a peripheral projection part; and a leading end of the peripheral projection part comes into contact with the front surface of the tuner.

BRIEF DESCRIPTION OF THE DRAWINGS

FIGS. 1A and 1B are diagrams showing an attachment structures of a rear panel to a tuner according to a first embodiment of the invention, in which FIG. 1A is a side view showing a state where a rear panel subjected to burring is attached and fixed to a tuner that is small in depth size, and FIG. 1B is an enlarged side view of its main portion;

FIGS. 3A and 3B are diagrams showing an attachment structure of a rear panel to a tuner according to a second embodiment of the invention, in which FIG. 3A is a side view showing a state where a rear panel subjected to burring is attached and fixed to a tuner that is small in depth size, and FIG. 3B is an enlarged side view of its main portion;

DETAILED DESCRIPTION OF THE PREFFERED EMBODIMENTS

Embodiments of attachment structure of a rear panel to a tuner according to the invention will be described below with reference to drawings.

Figure 1A:
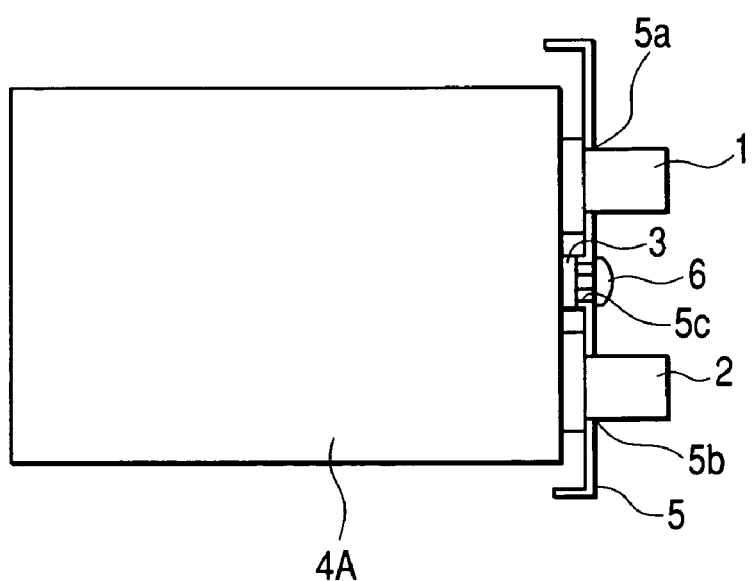
Figure 1B:
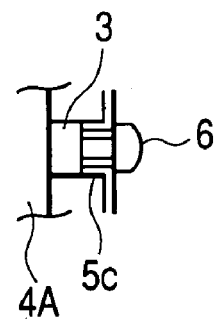
Figure 2:
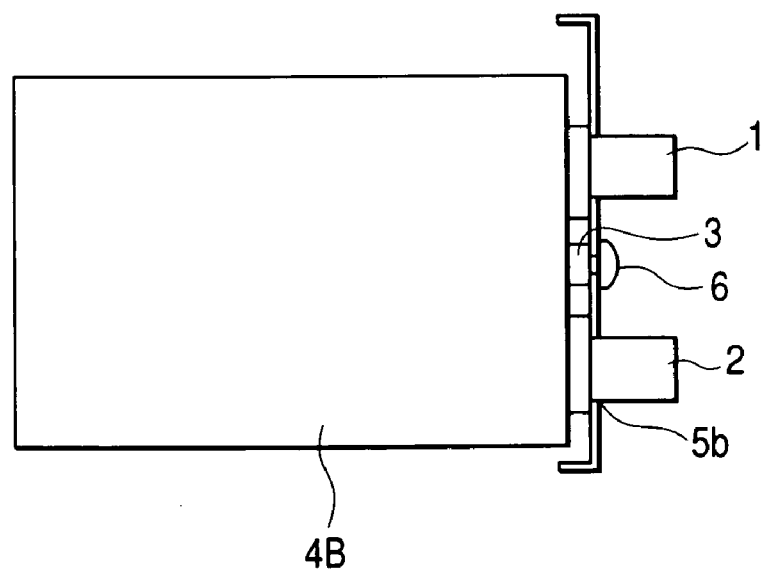
FIG. 2 is a side view showing a state where a rear panel is attached and fixed to a tuner that is large in depth size.

FIGS. 1A and 1B show an attachment structure of a rear panel to a tuner according to a first embodiment of the invention, in which FIG. 1A is a side view showing a state where a rear panel subjected to burring is attached and fixed to a tuner that is small in depth size, and FIG. 1B is an enlarged side view of its main portion. FIG. 2 is a side view showing a state where a rear panel is attached and fixed to a tuner that is large in depth size.

In the attachment structure of the rear panel to the tuner according to the first embodiment, as shown in FIGS. 1A, 1B, and 2, on a front surface of each of tuners 4A and 4B different from each other in depth size, in which two connector connection parts 1, 2 each having a step are protruded in front, and a small protrusion 3 with a tapped hole for panel attachment is provided in a middle position between the connector connection parts 1 and 2, a real panel 5 is attached and fixed.

As shown in FIG. 1A, the rear panel 5 to be attached and fixed onto the front surface of the tuner 4A that is smaller in depth size has, in portions corresponding to the two connector connection parts 1, 2 of the tuner 4A, two holes 5a, 5b for inserting these connector connection parts 1, 2, and has, in a portion corresponding to the small protrusion 3 with the tapped hole of the tuner 4A, a small cylindrical part 5c that is formed protrusively to the tuner 4A side by burring.

When the rear panel 5 is attached onto the front surface of the tuner 4A, the two connector connection parts 1, 2 with the steps of the tuner 4A are inserted into the two holes 5a, 5b of the rear panel 5, and, as shown in FIG. 1B, a leading end of the small cylindrical part 5c is brought into contact with a front surface of the small protrusion 3 with the tapped hole of the tuner 4A. Under this state, a male screw 6 is inserted into the small cylindrical part 5c from the front surface side of the rear panel 5, and further a leading end of this male screw 6 is screwed into the tapped hole of the small protrusion 3 with the tapped hole of the tuner 4A, whereby the rear panel 5 is attached and fixed onto the front surface of the tuner 4A.

Further, as shown in FIG. 2, onto a front surface of a tuner 4B which is larger in depth size, a rear panel 5 that has not been subjected to burring is attached and fixed.

Therefore, according to this first embodiment, the attachment structure of the rear panel 5 to the tuner 4A can be simplified, structure of a die for molding this rear panel 5 can be simplified, and the rear panel 5 can meet widely the tuners 4A and 4B different in depth size.

Figure 3A:
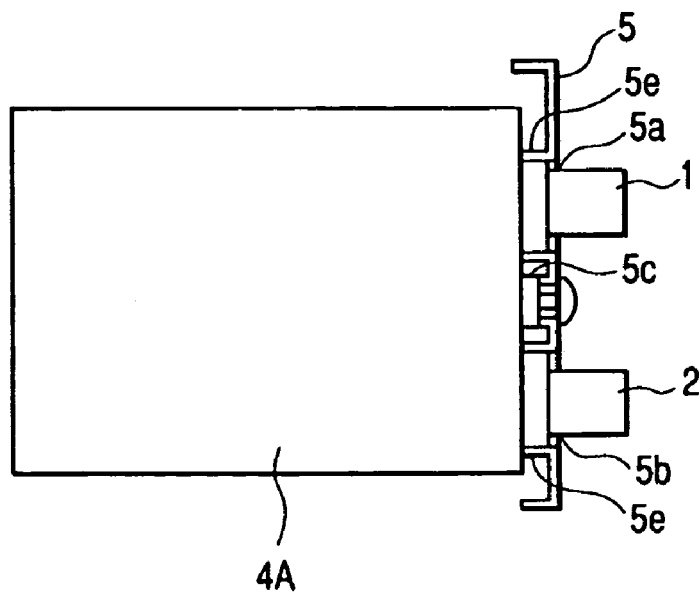
Figure 3B:
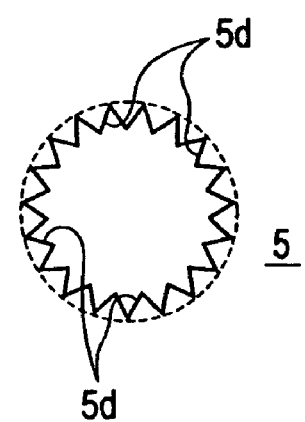
Figure 4:
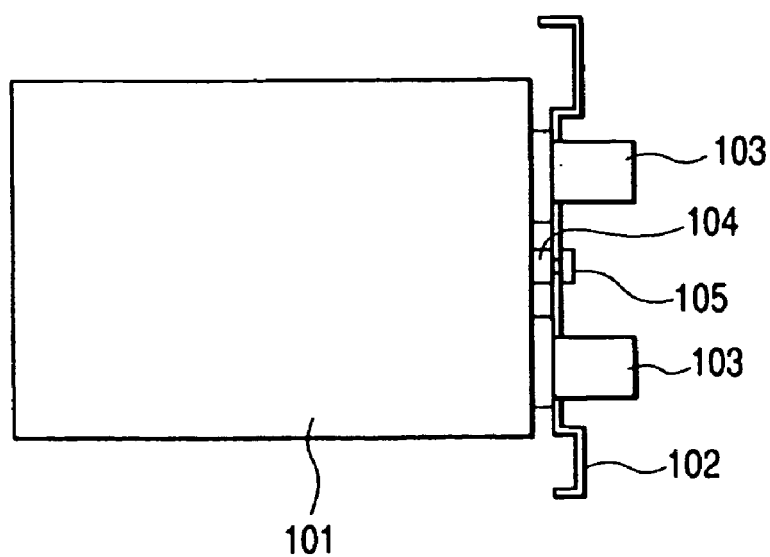
FIG. 4 is a diagram showing a conventional attachment structure of a rear panel to a tuner, and also a side view showing a state where a rear panel subjected to drawing is attached and fixed to a tuner.
Figure 5:
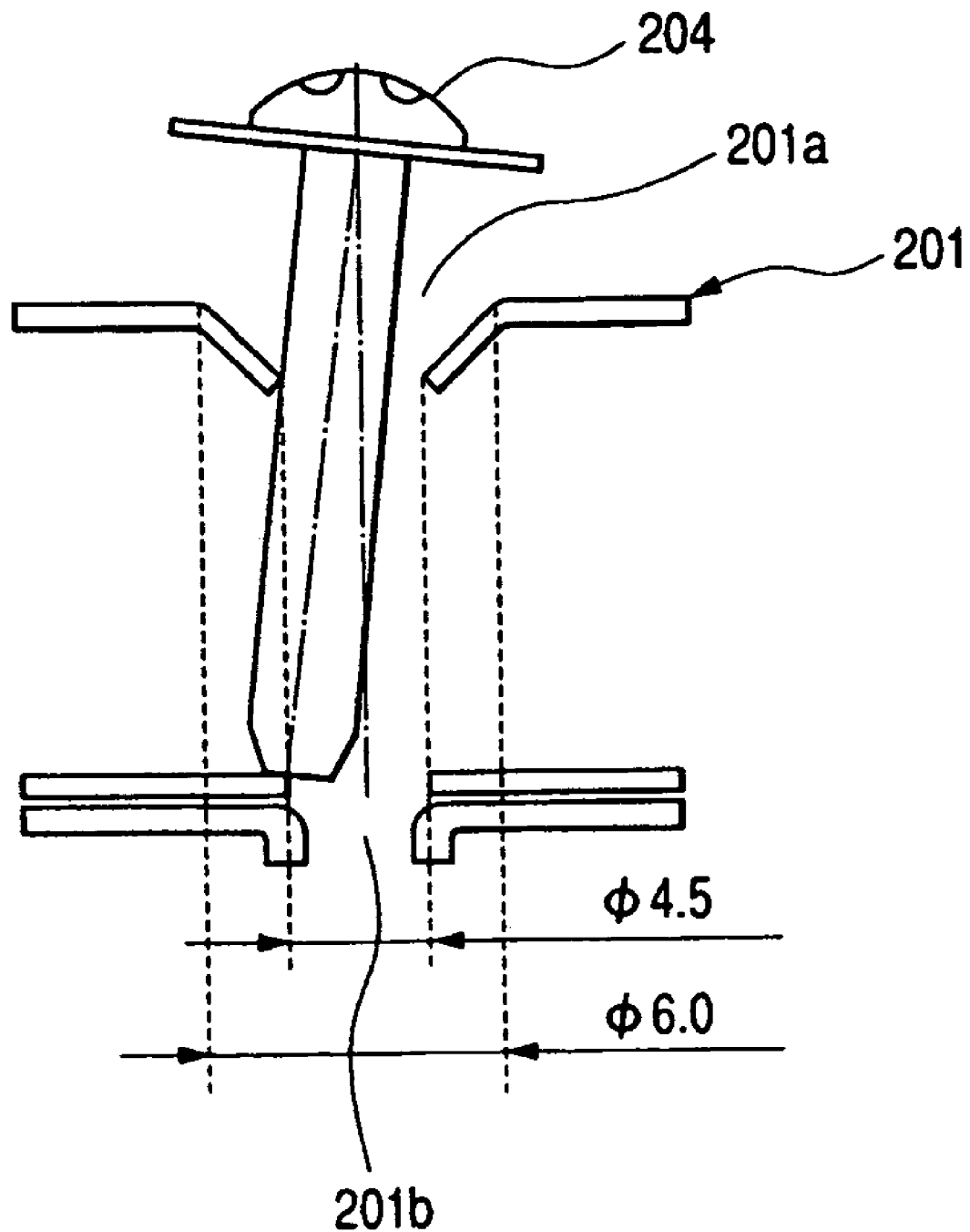
FIG. 5 is a partially sectional view showing conventional assembly structure of a housing.

FIGS. 3A and 3B show an attachment structure of a rear panel to a tuner according to a second embodiment of the invention, in which FIG. 3A is a side view showing a state where the rear panel subjected to burring is attached and fixed to a tuner that is small in depth size, and FIG. 3B is an enlarged side view of its main portion.

In the attachment structure of the rear panel to the tuner according to this second embodiment, as shown in FIGS. 3A and 3B, a small cylindrical part 5c of a rear panel 5 is formed by burring; in a portion of each of two holes 5a, 5b, a part having plural cuts 5d in circular direction of a hole edge is formed by blanking, and the cuts 5d are bent toward the front side of the tuner 4A thereby to form peripheral projection parts 5e, 5e; and a leading end of this peripheral projection part 5e comes into contact of the front surface of the tuner 4A.

Therefore, according to the second embodiment, also with the front surfaces of the connector connection parts 1, 2 of the tuner 4A, the peripheral projection parts 5e, 5e come into contact. Therefore, the rear panel 5 can be firmly attached and fixed to the tuner 4A without shaking.

Further, the two holes 5a and 5b of the rear panel 5 may be formed into the peripheral projection parts 5e, 5e by burring.

Further, the small cylindrical part 5c of the rear panel 5 may be formed by blanking.

As described above, according to the first aspect of the invention, there is provided an attachment structure of a rear panel to a tuner, in which a rear panels is attached and fixed onto a front surface of a tuner, the tuner having two connector connection parts protruding in front and a small protrusion with a tapped hole for panel attachment provided in a middle position between the connector connection parts, the attachment structure including: the rear panel having two holes for inserting the connector connection parts in portions corresponding to the two connector connection parts of the tuner and a small cylindrical part that is formed protrusively to the tuner side by burring in a portion corresponding to the small protrusion with the tapped hole of the tuner; and a male screw; wherein the two connector connection parts of the tuner are inserted into the two holes of the rear panel, and a leading end of the small cylindrical part is brought into contact with a front surface of the small protrusion with the tapped hole of the tuner, and under this state, the male screw is inserted into the small cylindrical part from the front surface side of the rear panel and further a leading end of the male screw is screwed into the tapped hole of the small protrusion with the tapped hole of the tuner, whereby the rear panel is attached and fixed onto the front surface of the tuner. Therefore, the following effects are obtained.

Namely, since the small cylindrical part is only provided for the portion in the rear panel corresponding to the small protrusion with the tapped hole of the tuner by burring, the attachment structure of the rear panel to the tuner can be simplified, the structure of the die for molding this rear panel can be simplified, and the rear panel can meet widely the tuners different in depth size.

According to the second aspect of the invention, there is provided an attachment structure of a rear panel to a tuner, in which a rear panels is attached and fixed onto a front surface of a tuner, the tuner having two connector connection parts protruding in front and a small protrusion with a tapped hole for panel attachment provided in a middle position between the connector connection parts, the attachment structure including: the rear panel having two holes for inserting the connector connection parts in portions corresponding to the two connector connection parts of the tuner and a small cylindrical part that is formed protrusively to the tuner side in a portion corresponding to the small protrusion with the tapped hole of the tuner; and a male screw; wherein the two connector connection parts of the tuner are inserted into the two holes of the rear panel, and a leading end of the small cylindrical part is brought into contact with a front surface of the small protrusion with the tapped hole of the tuner, and under this state, the male screw is inserted into the small cylindrical part from the front surface side of the rear panel and further a leading end of the male screw is screwed into the tapped hole of the small protrusion with the tapped hole of the tuner, whereby the rear panel is attached and fixed onto the front surface of the tuner. Therefore, the following effects are obtained.

Namely, since the small cylindrical part is only provided for the portion in the rear panel corresponding to the small protrusion with the tapped hole of the tuner, the attachment structure of the rear panel to the tuner can be simplified, the structure of the die for molding this rear panel can be simplified, and the rear panel can meet widely the tuners different in depth size.

According to the third aspect of the invention, the small cylindrical part of the rear panel is formed by burring, and the peripheral projection part that comes into contact of the front surface of the tuner is formed in the portion of each of the two holes by burring. Therefore, the attachment structure of the rear panel to the tuner can be simplified, the structure of the die for molding this rear panel can be simplified, and the rear panel can meet widely the tuners different in depth size.

Further, also with the front surfaces of the connector connection parts of the tuner, the peripheral projection parts of the rear panel come into contact. Therefore, the rear panel can be firmly attached and fixed to the tuner without shaking.

According to the fourth aspect of the invention, the small cylindrical part of the rear panel is formed by burring; in the portion of each of the two holes, a part having plural cuts in circular direction of the hole edge is formed by blanking, and the cuts are bent toward the front side of the tuner thereby to form the peripheral projection part; and the leading end of this peripheral projection part comes into contact of the front surface of the tuner. Therefore, in the two holes of the rear panel, the peripheral projection parts are formed by blanking, so that the attachment structure of the rear panel to the tuner can be simplified, the structure of the die for molding this rear panel can be simplified, and the rear panel can meet widely tuners different in depth size.

Further, also with the front surfaces of the connector connection parts of the tuner, the peripheral projection parts of the rear panel come into contact. Therefore, the rear panel can be firmly attached and fixed to the tuner without shaking.

What is claimed is:

1. An attachment structure of a rear panel to a tuner, in which a rear panel is attached and fixed onto a front surface of a tuner, the tuner having two connector connection parts protruding in front and a small protrusion with a tapped hole for panel attachment provided in a middle position between the connector connection parts, the attachment structure comprising:

the rear panel having two holes for inserting the connector connection parts in portions corresponding to the two connector connection parts of the tuner and a small cylindrical part that is formed protrusively to the tuner side in a portion corresponding to the small protrusion with the tapped hole of the tuner; and a male screw;

wherein the two connector connection parts of the tuner are inserted into the two holes of the rear panel, and a leading end of the small cylindrical part is brought into contact with a front surface of the small protrusion with the tapped hole of the tuner, and under this state, the male screw is inserted into the small cylindrical part from the front surface side of the rear panel and further a leading end of the male screw is screwed into the tapped hole of the small protrusion with the tapped hole of the tuner, whereby the rear panel is attached and fixed onto the front surface of the tuner, wherein the small cylindrical part of the rear panel is formed by burring;

in a portion of each of the two holes, a part having plural cuts in circular direction of a hole edge is formed by blanking;

the cuts are bent toward the front side of the tuner thereby to form a peripheral projections part; and a leading end of the peripheral projection part comes into contact with the front surface of the tuner.

* * * * *